3,098,692
TREATMENT AND COLORING OF POLYOLEFINS
Domenick Donald Gagliardi, 185 Howland Road,
East Greenwich, R.I.
No Drawing. Filed Feb. 27, 1961, Ser. No. 91,639
30 Claims. (Cl. 8—55)

This invention relates to treatment and coloring of preformed articles made of polyolefins. More particularly, the invention concerns (a) the treatment of preformed articles formed of solid polyolefins, e.g., polyethylene, polypropylene, polybutylene, etc., so that the articles will have surfaces which are receptive to dyes, pigments, resins or the like and so they may be dyed in deep shades with water-soluble textile dyes, (b) the products which result from such treatments, (c) methods for coloring fibers, films, tubes and other solid articles preformed of polyolefins and (d) the colored articles which result from such procedures.

FIELD OF THE INVENTION

Polyethylene, polypropylene and other polyolefins have become commercially very important for a number of reasons. For one, the olefins from which the polymers can be formed are readily available at relatively low cost. Also, the polyolefins are easy to fabricate into fibers, films, sheets, rods or other preformed articles, so the final articles are so inexpensive there is a wide demand for them. The low cost of the polyolefins and the many useful properties which they possess make them attractive to a massive consumer market. Thus, the polyolefins have high strength, resistance to attack by insects or micro-organisms, e.g., mildew or molds, and generally high resistance to corrosion or attack by chemical agents.

The high degree of chemical inertness of the polyolefins, while a very desirable property from many points of view, has been a disadvantage with respect to the coloring of such materials. Actually, the inability of polyolefins to be satisfactorily dyed without recourse to prohibitively expensive procedures has materially limited the extent of use of the polyolefins. The difficulty of dyeing polyolefins has particularly restricted the use of polyolefin fibers in the apparel and home textile markets because polyolefin fibers could not previously be dyed with the normal water-soluble textile dyes.

The problems of satisfactorily dyeing polyethylene, polybutylene and other polyolefins has received close attention from all parties connected with the problem, e.g., polymer and fiber makers, dyestuff producers, textile mills and equipment makers.[1] One approach to the problem has been to develop special dyes for specific use with polyolefins fibers. However, poor leveling, crocking and lack of light fastness have so far generally thwarted this approach to the problem.

Another approach to the problem has been to modify the polymers by copolymerizing the olefins with small percentages of other monomers which render the resulting olefin copolymers more receptive to existing dyes. Irradiation of the polymers has also been attempted in order to render the materials more receptive to dyes or to graft dye-receptive monomers onto the polymers.

Attempts have also been made to fix pigment particles on the fibers or other articles of the solid polyolefins utilizing resins, adhesive, binders or the like to anchor the pigment particles. However, such colorations of the polyolefins are generally unsatisfactory since only peripheral coloring is obtained and the color is easily removed by abrasion, wear, crocking, soaping, drycleaning or other end use environments.

[1] Chemical Week, January 7, 1961, 43–44.

Obviously, any method which will permit polyolefins to be satisfactorily dyed, should not be so expensive as to substantially increase the price of the final colored article. Furthermore, the coloring of polyolefins, such as by pigmenting prior to forming fibers, films or other articles is not satisfactory because of the inventory problems created by the need to handle large quantities of many different colors. This also causes problems in textile mills where airborne bits of fibers may contaminate other fibers. Moreover, any method used to improve the coloring qualities of polyolefins should not detrimentally affect the desirable properties of the polymers or the products made therefrom.

There is also difficulty in adhering pigments, resins and other materials to the surfaces of polyolefins. Obviously, it would be most desirable to have some inexpensive method for making polyolefins receptive to existing dyes, pigments and similar materials, since this would permit manufacturers to use the knowhow, dye and pigment compositions and equipment already available to them, and would keep the cost of coloring the polyolefins at a minimum.

OBJECTS

A principal object of this invention is the provision of new processes for coloring polyolefins. Further objects include:

(1) The provision of new processes for rendering preformed articles of solid polymers of olefins which normally are incapable of being satisfactorily dyed with aqueous dye baths capable of being dyed in deep shades with water-soluble textile dyes.

(2) The provision of fibers, films, sheets, rods and other preformed articles of solid polyolefins which are capable of being dyed in deep shades with water-soluble textile dyes.

(3) The provision of new processes for coloring preformed articles of solid polyolefins which can be conducted with equipment generally available in textile manufacturing plants and which can be used in conjunction with presently existing, commercially available, water-soluble dyestuffs and established dyeing procedures.

(4) The provision of new forms of colored fibers, films, sheets, rods or other solid preformed articles of polyolefins.

(5) The provision of new methods of adhering water-insoluble, non-ionic pigments to the surfaces of preformed polyolefins.

(6) The provision of new methods of increasing the adhesion of laminating resins to polyolefins.

(7) The provision of new methods of reducing the electrostatic properties of polyolefins.

(8) The provision of new methods of increasing the receptivity of polyolefins to water-repellent agents and other coating finishes.

Other objects and further scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

GENERAL DESCRIPTION

These objects are accomplished according to the present invention by imbuing preformed articles made of solid polyolefins with an oleophilic organic compound having a molecular weight between about 100 and 800 and which contains a basic nitrogen atom. This is accomplished by applying a fluid comprising such a nitrogen organic compound to the preformed article, allowing the applied fluid to remain in contact with the article under the imposed conditions for a time sufficient to permit an appreciable amount of the organic compound to become so associated with the article that the organic compound can virtually not be removed without destruction of the preformed article, and then treating the article to remove any excess of the treating fluid from the article, leaving the article receptive to water-soluble textile dyes, but otherwise substantially unchanged in appearance, strength or other physical properties.

Specifically described as applied to fibers or fabrics formed of polyolefins, the new operations involve:

(a) Wetting the polyolefin fibers or fabric with a fluid comprising oleophilic organic compounds of the type specifically defined hereinafter;

(b) Drying the fibers or fabrics;

(c) Heating the dried fibers or fabrics to a temperature from about 100° F. to about 10° F. below the fusion temperature of the fibers for between about 1 and 120 minutes;

(d) Scouring the resulting fibers or fabrics to remove any excess of the organic compound not imbued in the fibers.

(e) Finally, such treated fibers or fabrics may be dyed to level deep shades with a water-soluble, anionic textile dye, may be coated with pigments, etc.

The oleophilic organic compounds which constitute an essential feature of the invention, should have a molecular weight between about 100 and 800 and preferably between about 150 and 600. The compound must contain a basic nitrogen atom which may appear as a primary, secondary or tertiary amine, salt thereof, or as one of the atoms forming the ring structure of a heterocyclic compound. The organic compound must also contain a non-polar hydrocarbon group containing at least six carbon atoms and preferably between about 12 and 18 carbon atoms.

A preferred group of organic nitrogen compounds for use in carrying out the new processes of this invention are those having the formula:

wherein $R_1$ is an alkyl, aryl or cycloalkyl radical containing at least 6 carbon atoms.

$R_2$ is a hydrogen, alkyl, aryl, cycloalkyl or alkylene radical, and $R_3$ is a radical selected from the group consisting of $R_5$,

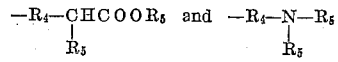

which together with $R_2$ may complete a heterocyclic ring, $R_4$ is a divalent radical selected from the group consisting of alkylene, arylene, cycloalkylene, and polyamino polyalkylene, and $R_5$ is a hydrogen, alkyl, aryl, alkylene or cycloalkyl radical.

$R_4$ is preferably —$CH_2CH_2$—, —$CH_2CH_2CH_2$— or —$CH_2CH_2$—$NH_2CH_2CH_2$—, and $R_5$ is preferably a hydrogen or a 1 to 18 carbon atom alkyl radical.

The precise reason for the success of the new processes of this invention has not been established. However, it appears that in the treatment of preformed articles of polyolefins with the specified nitrogen containing organic compounds, the non-polar, oleophilic hydrocarbon group $R_1$ dissolves in and penetrates at least the surface of the polyolefin article, carrying along thereby the polar nitrogen containing portion of the compounds. The presence of this basic nitrogen group on the polyolefin renders it dyeable with conventional water-soluble, anionic textile dyes, i.e., direct dyes, fiber-reactive dyes, acid dyes, vat dyes, metalized dyes, sulfur dyes and naphthol dyes. Because of the water-insoluble nature of the treating compounds as specified for use with this invention, after coupling with the textile dyes, the coloration produced in the polyolefin fibers or other solid articles is durable to washing, drycleaning and other treatments normally applied to articles of the type which would be colored in aqueous dye baths.

EXAMPLES

The following examples of actual, specific operations in accordance with this invention are given by way of introduction to the detailed description which follows. In these examples, and throughout the disclosure, all parts and percentages are by weight unless otherwise specified.

*Example 1A*

Swatches of a polypropylene woven fabric were padded at 70° F. through a solution which contained 10 parts of N-dodecyl propylene diamine
10 parts of acetic acid
1 part of polyethylene oxide wetting agent
179 parts of water The impregnated swatches were air dried for two hours and then separate swatches were heated in an air circulating oven for five minutes at different temperatures, i.e., 200, 210, 220, 230, 240, and 250° F. After such heating, the swatches were scoured in a solution of 0.1% synthetic detergent at 140° F. and given several hot water rinses to remove any amine not imbued by the fibers of the swatches.

*Example 1B*

The heated swatches of Example 1A and a swatch of the original untreated polypropylene fabric were dyed with a red premetallized acid dye, "Capracyl Red B" (Dupont). The dyebath contained 3% dyestuff based on the weight of fabric and the fabric-bath ratio was 30:1. The fabrics were immersed in the dyebath at 80° F. With continuous agitation, the bath temperature was raised to 180° F. in 30 minutes, maintained at 180° F. for another 30 minutes, maintained at 180° F. for another 30 minutes after which the samples of fabrics were removed from the dyebath, rinsed in a water solution of 0.1% synthetic detergent at 120° F., rinsed in warm water and dried. Examination of the polypropylene swatches showed that the unmodified fabric showed virtually no change in color. All of the amine treated swatches were deeply colored. Very little difference in depth of shade could be noted in the treated samples heated at the different temperatures of 200–250° F.

*Example 2*

Swatches of polypropylene woven fabric treated as in Example 1A and a piece of untreated polypropylene fabric were dyed with 3% of "Procion Brilliant Red," a red cyanuric chloride based cellulose reactive dye (Arnold Hoffman Co.). The dyeing cycle was as reported for Example 1B. After the dyeing operation, it was observed that only a very slight coloration was produced in the untreated polypropylene fabric, while all of the amine treated fabrics were deeply and uniformly red colored.

*Example 3*

Additional dyeings were made on samples of polypropylene woven fabrics treated with the N-dodecyl propylene diamine as in Example 1A. In these dyeings, 3% "Metromine RF Brown BRL," a brown direct dye (Metro-Atlantic Inc.) and, in another series, 3% "Wooncolan Black WA," a black acid dye (Woonsocket Color and Chemical Co.) were used in dyeing cycles similar to that of Example 1B. After dyeing, it was observed that only a very slight tinting was produced on the untreated polypropylene fabric, while the treated fabric was deeply colored by both the direct and the acid dye.

Example 4

Samples of polypropylene and polyethylene woven fabrics were padded through solutions containing:

5 parts of amine to be tested
5 parts of acetic acid
90 parts of water

After impregnation, the swatches of both fabrics were dried and cured immediately for 10 minutes at 240° F. A control swatch of each fabric was padded through plain water and given the same heat treatment. After heating, all swatches were given a drastic alkaline scour at 200° F. with 0.5% built synthetic detergent ("Tide") and 0.2% $Na_2CO_3$ in attempts to extract amines from the fibers. The amines used were:

N-carboxypropyl dodecyl amine
N,N-dicarboxypropyl octadecyl amine
Rosin amine
N-octadecyl propylene diamine
N-dodecyl propylene diamine
N-dioctadecyl amine
Dodecyl amine
1-octadecenyl-3-hydroxyethyl imidazoline
Tallow amine After treatment and scouring, all swatches were dyed in four separate series with 3% of the direct dye, "Metromine RF Brown BRL"; 3% of the acid dye, "Wooncolan Black WA"; 3% of the green acid dye "Anthraquinone Green GNN" (Dupont); and 3% of the premetallized acid dye, "Capracyl Red B." Upon examination of the swatches, it was found that the untreated polyolefin fabrics had been only very slightly tinted by any of the dyes. All of the fabric samples treated with the various amines were heavily colored. Various depths of shade were given by the series of amines which varied widely in molecular weight. Deepest colors were produced by the propylene diamine compounds, rosin amine and the imidazoline. The results of the example indicate that the amines had become part of the fiber and could not be extracted by extraction methods not destructive to the fibers.

Example 5

Samples of polypropylene woven fabric were immersed in solvent solutions (70° F.) of N-dodecyl propylene diamine containing 5 parts of the amine and 95 parts of isopropyl alcohol. They were removed from the solvent bath, passed through rubber squeeze rollers to remove excess solution, dried for 10 minutes at 240° F., scoured as in Example 4, and dyed with 3% of the direct dye, "Metromine RF Brown BRL," along with a piece of the original untreated fabric. Deep dyeing was produced in the amine treated samples and only very slight tinting was produced in the untreated fabric.

Example 6

Samples of polyethylene and polypropylene woven fabrics were boiled for 30 minutes in a solution containing 5 parts N-Soya propylene diamine, 5 parts of acetic acid and 90 parts of water. After boiling, the swatches were scoured as in Example 4 and dried. Dyeing as in Example 5 produced fabrics colored deeply and uniformly.

Example 7

Samples of polypropylene woven fabric were placed in a molten bath of N-dodecyl propylene diamine at 150° F. for 30 minutes. They were then removed, scoured as in Example 4 and dyed as in Example 5. Medium depth of shade was produced indicating some of the molten amine imbued the fibers of the fabric.

Example 8

Samples of polypropylene fabric were treated by padding with solutions containing the copper coordination compounds of N-tallow propylene diamine prepared by dissolving the following ingredients in treating baths:

(A) 5 parts of N-tallow propylene diamine
1 part copper acetate
5 parts acetic acid
89 parts water
(B) 5 parts of N-tallow propylene diamine
3 parts copper acetate
5 parts acetic acid
87 parts water
(C) 5 parts of N-tallow propylene diamine
5 parts copper acetate
5 parts acetic acid
85 parts water The impregnated swatches were dried at 80° F. for one hour and then were cured for 15 minutes at 240° F. After curing, they were scoured as in Example 4 and dyed with 3% of the blue sulfone fiber reactive dye, "Remazol Brilliant Blue R" (Hoechst) along with swatches of untreated fabric. Only a very slight tinting was given to the untreated material while deep dyeing was produced in the amine-copper treated fabrics. The color of the treated fabrics was not affected by a five minute wash at 120° F. with soap. Two other sets of swatches treated as above were dyed with a red direct dye, "Superlitefast Red 3BL" (Althouse Co.) and "Procion Yellow R," a yellow fiber reactive dye (Arnold Hoffman Co.). Again, only slight tinting was produced on the untreated fabrics while deep coloring was produced in the amine treated fabrics.

Example 9

Pieces of polypropylene fabrics treated as in Example 8 were dyed with 3 different vat dyes in their ester form in a continuous pad-dye operation. The dye padding bath contained:

20 parts soluble vat dye
10 parts sodium nitrite
1 part sodium carbonate
1 part wetting agent
968 parts water The samples were padded through the above solution, aged for 30 seconds and developed in 2% sulfuric acid bath at 140° F., followed by rinsing and scouring to remove acid and unreacted dyestuff. No color at all was produced on samples of untreated fabric. All of the treated fabrics were colored by the vat dyes. The color was durable to alkaline washing.

Example 10

Samples of polypropylene fabric were treated by padding at 70° F. with different concentrations of one amine, namely, 1, 3, 5, and 10% amine and corresponding amounts of acetic acid. The amine used was N-octadecyl ethylene diamine. After drying for 15 minutes at 240° F., the samples were scoured in a solution of 5% acetic acid to see if the applied amine could be extracted from the polyolefin fibers. After the acid extraction, the samples were dyed with 3% "Wooncolan Black WA," a black acid dye, along with pieces of untreated controls. Only a slight gray tint was produced in the untreated fabric. All of the treated and acid extracted fabrics were colored by the dye. The degree of coloration varied from strong gray to heavy black depending on the concentration of amine applied.

Example 11

Polypropylene fibers were treated wtih different acidic solutions of a N-alkyl propylene diamine of the formula $R—NHCH_2CH_2CH_2NH_2$, where R was derived from soya bean oil and comprised 20% hexadecyl, 17% octadecyl, 26% octadecenyl, and 37% octadecadienyl mixture. Five parts of this amine were mixed with five parts of the following acidic substances in 90 parts of water;

gluconic acid, lactic acid, acetic acid, copper acetate, nickel acetate, chromium acetate, and zinc acetate to form seven different treating baths. Fibers were immersed in the different baths at 70° F. for 5 minutes, removed and then dried for 15 minutes at 240° F., scoured as in Example 4 and dyed with 3% of a wine-red direct dye, "Cuprofix Bordeaux" (Sandoz) along with untreated fibers. Only a very slight tinting was obtained in the untreated material. Varying degrees of dyeing were produced from the different acidic amine treatments. Medium depth of shade was found with the gluconic and lactic acid treatments and very deep shades by the other treatments. Similar results from the above treatments were obtained when the fibers were dyed with a sulfur, a naphthol, and a vat dye.

*Example 12*

Films of polyethylene, 4 mils thick, were wetted with a solution containing 5 parts of N-dodecyl ethylene diamine in 95 parts of isopropyl alcohol. After air drying for one hour, the film was heated at 220° F. for 10 minutes. The film along with a piece of the original untreated polyethylene was dyed in a dyebath containing 3% of a direct dye, "Cuprofix Bordeaux." After dyeing, the samples were rinsed and air dried. No color was found in the untreated film. The treated polyethylene film was colored a deep wine-red color.

*Example 13*

A ⅛ inch thick film of polybutylene was soaked in an isopropanol solution containing 5% N-octadecyl propylene diamine. The sample was removed from the solution, air dried and cured for 30 minutes at 150° F. The film was spot printed with a print paste containing 5% of a red pre-metalized acid dye, "Calcocid Red" (Cyanamid), air dried, cured again for 30 minutes at 150° F., rinsed and dried. The printed areas had a deep red color. When the same printing operation was repeated on a piece of untreated polyolefin film, all of the color was removed by rinsing.

*Example 14*

This example relates to the simultaneous treatment of polyolefin with an oleophilic nitrogen-containing organic compound and a water-insoluble, non-ionic pigment, i.e., a vat dye in its keto form.

A print paste containing 5% of the green vat dye, "Jade Green," and 5% of rosin amine acetate was printed on pieces of untreated polypropylene fabric. A similar print paste with the vat dye, but with no rosin amine acetate, was also printed on untreated polypropylene. After aging for 15 minutes at 240° F., both sets of printed fabrics were rinsed in synthetic detergent. All of the color was removed from the prints which did not contain the rosin amine. Deep green printed areas were present in the prints which contained the rosin amine.

DETAILED DESCRIPTION

A general definition of the oleophilic nitrogen containing organic compounds which may be used in carrying out the processes of this invention has been set forth in a preceding portion of this disclosure and a number of specific examples of such compounds have been given in the preceding examples. A multitude of such compounds are available and the following list will provide the reader with further examples of usable materials and indicate to the skilled chemist or colorist equivalent materials which may be utilized in the new operations.

Alkylmonoamines:
  Hexylamine
  Dodecylamine
  N-methyl dodecylamine
  Octadecylamine
  N,N-dicarboxypropyl octadecylamine
  Tallowamine
  Hydrogenated tallowamine
  Octadecenylamine
  N-ethyloctadecylamine
  N-carboxypropyl dodecylamine
  Tertiary octylamine
  Dioctadecylamine
  N-carboxymethyl octadecylamine
  N-carboxypropyl N-methyl dodecylamine
  Cocamine
  Dihexylamine
  N,N-diethyl octadecylamine
  Docosanylamine
  Triacontanylamine
  N-hydroxypropyl octadecylamine
  N-carbethoxy octadecylamine
  N-carboxyphenyl octadecylamine
  N-4-hydroxyphenyl N-methyl octadecylamine
Alkyl polyamines:
  N-dodecyl ethylene diamine
  N-dodecyl propylene diamine
  N-octadecyl N'-methyl propylene diamine
  N-octadecyl ethylene diamine
  N-hexyl propylene diamine
  N,N-dioctyl N'-octadecyl propylene diamine
  N-aminopropyl hexadecylamine
  N-carboxypropyl N'-dodecyl propylene diamine
  docosanyl ethylene diamine
  N-hydroxyethyl N'-dodecyl propylene diamine
  N-dodecyl diethylene triamine
  N-octadecyl tetraethylene pentamine
Aryl monoamines:
  N-ethyl aniline
  N-methyl benzylamine
  Naphthylamine
  N-dodecyl aniline
  N-4-diphenyl octylamine
  N-hexyl N-4-hydroxyphenyl aniline
  N-carbethoxy naphthylamine
  N,N-dihexyl aniline
  N-phenyl N-4-chlorophenyl octylamine
Aryl polyamines:
  N-phenyl propylene diamine
  N-phenyl N'-dodecylehthylene diamine
  N-benzyl N-octadecyl diethylene triamine
  N-aminopropyl naphthylamine
  N-carboxypropyl N'-dodecyl N'-phenyl ethylene diamine
  N-docosanyl N'-xylyl propylene diamine
Cycloalkyl monoamines:
  Cyclohexylamine
  Dicyclohexylamine
  2-octyl cyclohexylamine
  N-dodecyl cyclohexylamine
  N-methoxyoctyl cyclohexylamine
  N-octadecyl 4-methyl cyclohexylamine
  N-octadecyl cyclooctylamine
  Rosin amine
  N-hydroxyethyl rosin amine
Cycloalkyl polyamines:
  N-cyclohexyl ethylene diamine
  N-cyclohexyl propylene diamine
  N-cyclohexyl N-octadecyl diethylene triamine
  N-2-methylcyclohexyl N-aminoethyl dodecylamine
  N-cyclohexyl N'-phenyl ethylene diamine
  N-cyclohexyl N-phenylaminoethyl dodecylamine
  N-aminopropyl rosin amine
Hetereocyclic compounds:
  1-octadecenyl-3-hydroxyethyl imidazoline
  1-dodecyl imidazoline
  N-dodecyl morpholine
  3-octyl pyrrolidine
  1-hexyldecyl imidazoline
  5-octadecyl pyrimidine
  2,3-dihexyl pyrazine
  2-phenyl 3-dodecyl pyridine
  2-amino 3-dodecyl pyridine 3-octadecyl piperidine
3-benzyl 4-amino 5-octyl pyridine
5-dodecyl 2-pyrazoline
2,4-dioctyl pyrazine
2-hexadecyl 3-chloropyridine By the term "oleophilic" as used herein in the definition of the nitrogen containing organic compounds is meant solubility in long chain hydrocarbons and insolubility in water, i.e., a solubility of at least 1 gram in 10 grams of hexane at 70° F. and a solubility in water not exceeding the solubility of hexylamine in water.

Whether partial or complete penetration of the compound into the fibers or films takes place is presently not known. That penetration is involved is evidenced by the durability of the dyeing to washing and dry cleaning operations. This contrasts greatly with the known behavior of surface coatings colored by the mordant procedure, where the color of the material is easily removed by rubbing (crocking), by wear, and by washing and dry cleaning processes.

The organic compound described above may be applied to the polyolefin material by spraying, impregnation or coating from water dispersions, from solvent solution, from solubilizing systems using the lower organic acids or the zinc, copper, nickel, cobalt and chromium salts of formic and acetic acid, and similar carboxylic acid and by vapor phase treatments.

The use of the metal salts gives synergistic effects on depth of shade and improves the light stability of the dyed polyolefin.

In order to insure penetration and solution of the compound in the polyolefin fibers it is preferred to age the treated material so as to allow time for diffusion. The aging may be accomplished by several hours storage at room temperature, by elevated temperatures of 100–250° F. in periods of 1 to 120 minutes, preferably 1–15 minutes, depending on the weight of the textile item being treated, or by flash diffusion under pressure or in the presence of supersaturated steam. Temperature ranges from 100° F. to near the softening point, but at least 10° F. below the melting point of the polyolefin are useful. Boiling from suitable solvent solutions of the compounds may also be useful.

After treatment of the polyolefin textile material by any of the above methods, it is preferred to scour the material to remove any loosely held compound by the use of conventional textile scouring techniques using water solutions of soaps and synthetic detergents. After these series of operations, the polyolefin textile material can now be dyed or printed with textile dyes by any of the normal procedures known to those skilled in the art of dyeing textiles.

There are only general limits to the concentration of compound needed for the treatments prescribed. For example, in a padding method of applying the compound from an acidic water dispersion, good coloration of the polyolefin fibers may be obtained within the limits of from 0.1–5.0% deposited compound. If only light shades are desired, then the lower concentrations of compound are most economical to use. In general, the amount deposited is determined by the depth of shade required for a particular type of dyestuff and for a particular coloration process. It is recommended that the amount of oleophilic compound imbued in the polyolefin be within the limits of 0.01 to 10% by weight of the weight of the polyolefin.

Either during or after the application of the nitrogen organic compound, other chemical agents normally used to improve the properties of dyes may be combined in the process. For example, coordinating copper, chromium, zinc and nickel salts are commonly employed to improve the lightfastness of direct dyes. These may be applied with the nitrogen organic compound or may be used as an aftertreatment to the dyed polyolefin fibers.

Also various water soluble and water dispersible synthetic resins are commonly used to improve washfastness and crockfastness of naphthols, acid dyes, vat dyes, etc. Such synthetic resins include the amine-aldehyde resins, the acrylic resins, the aziridinyl phosphine oxide resins, the polyamine resins, and the dicyandiamide-formaldehyde resins. Again, these resins may be employed at any stage of the process to produce auxiliary dyeing benefits.

The invention is of particular importance for the coloring of fibers and other preformed articles made of solid polymers of olefins having 2–4 carbon atoms, although the new treatments appear to be applicable to all fiber-forming and comparable solid polyolefins. The invention especially concerns polymers of the class that have an inherent viscosity of at least 0.8 and particularly those having an inherent viscosity between about 1.2 and about 10. The term "inherent viscosity" as used herein, means the viscosity of a solution of 0.2 gram of the polymer in 50 cc. of tetralin at 130° C.[2][3]

Fiber-forming polyethylene is one of the important polyolefins which may be treated by the new operation. This polymer and its various methods of preparation are extensively described in the literature.[4] Likewise, fiber-forming polypropylene is an important material to be treated in accordance with this invention. Such products, too, are extensively described in the literature.[5] In addition to these homopolymers of 2–4 carbon atom olefins, copolymers of olefins with other unsaturated hydrocarbons, which copolymers are incapable of being satisfactorily dyed with aqueous dye baths, may be satisfactorily treated with the new procedures.

In addition to the improvements in dyeing of polyolefins which can be attained by the new treatment operations, it has been found (see Example 14 above) that such treatment also leads to coloration of the treated polyolefin with water-insoluble, non-ionic pigments which normally do not adhere to the polyolefin surface. Examples of such pigments, in addition to non-reduced vat dyes, are phthalocyamines, benzidines, chrome oxides, iron oxides, carbon black, coupled naphthols, titanium oxide, cobalt salts and the like. The specified oleophilic organic materials may be used as the sole binding agents for the pigments or they may be used with conventional binders to improve the adhesion to the polyolefin. The binding of water-insoluble pigments to polyolefin fiber and films has utility in the use of printing inks, labeling and production of decorative effects.

The new treatments also are effective in increasing the adhesion of laminating resins to polyolefins; reducing the electrostatic properties of polyolefins and increasing the receptivity of water-repellent agents and other coating finishes to polyolefins.

CONCLUSION

There has been described methods for the treatment of preformed polyolefin materials that make it possible for such materials to be dyed or printed with conventional textile dyes which have heretofore have not been usable for coloring fiber-forming polyolefins. Because of these new operations, it is not necessary for manufacturers of preformed articles of polyolefins to use "modified" olefin copolymers or pre-pigmented polyolefins. Furthermore, conventional textile plants with existing dyeing equipment using regular dyes may now dye and print the polyolefin textiles. As a result, the coloring of fabrics or other preformed articles of polyolefins can be accomplished at a very minimum cost.

[2] Ind. Eng. Chem., 35 (1943), 1108.
[3] J. Applied Physics, 17 (June 1946), 458–471.
[4] Encyclopedia of Chemical Technology, 1st supp. vol. (1957), 699–712.
[5] Encyclopedia of Chemical Technology, 2d supp. vol. (1960), 661–672.

While primarily directed to the dyeing of polyolefin textile materials, the present process may, with equal ease, be used for coloring polyolefin films, sheets, rods and other solid materials used in the plastic industries and for the packaging of consumer products.

Having provided a complete description of the invention in such a manner as to distinguish it from other inventions and from what is old and having provided a description of the best mode contemplated of carrying out the invention, the scope of patent protection to be granted the invention is defined by the following claims.

I claim:

1. A process for coloring a preformed article composed of solid polyolefin which comprises:
    (a) treating said article with an oleophilic organic compound, having a molecular weight between about 100 and 800 containing a basic nitrogen atom, and
    (b) dyeing said article with a water-soluble anionic textile dye.

2. A process as in claim 1 where the polyolefin is polypropylene.

3. A process as in claim 1 where the polyolefin is polyethylene.

4. A process as in claim 1 where the polyolefin is polybutylene.

5. A process as in claim 1 where said article is a fabric formed of fibers of fiber-forming solid polyolefin.

6. A process as in claim 1 where the article is formed of fibers of polyethylene.

7. A process as in claim 1 where the article is non-fibrous and the polyolefin is polypropylene.

8. A process as in claim 1 where the nitrogen organic compound is aminopropyl dodecyl amine.

9. A process as in claim 1 where the nitrogen organic compound is aminoethyl octadecyl amine.

10. A process as in claim 1 where the nitrogen compound is rosin amine.

11. A process as in claim 1 where the nitrogen compound is applied from an acidic water dispersion.

12. A process as in claim 1 where the nitrogen compound is applied from a hot melt.

13. A process as in claim 1 where the nitrogen compound is applied as a solution in an organic solvent.

14. A process as in claim 1 where the polyolefin is polypropylene and the nitrogen compound is cyclohexyl amine.

15. A process as in claim 1 where the polyolefin is polybutylene and the nitrogen compound is dimethyl octadecyl amine.

16. A process as in claim 1 where the polyolefin is polypropylene and the nitrogen compound is applied along with conventional dyeing assistants.

17. A process as in claim 1 where the colored material is aftertreated with anti-crock agents.

18. A process for the coloring of a preformed article composed of a solid polyolefin which comprises:
    (a) applying to said article an oleophilic organic compound having a molecular weight between 150 and 600 containing a basic nitrogen atom,
    (b) treating the resulting article to remove any of said organic compound which does not become permanently associated with the polyolefin during said application step and, thereafter,
    (c) dyeing said article with a water-soluble anionic textile dye.

19. A colored article composed of solid polyolefin produced by the process as defined in claim 18.

20. A process for coloring a fabric formed of fibers of solid polyolefin which comprises:
    (a) contacting the fabric with a fluid comprising an oleophilic organic compound having a molecular weight between about 150 and 600 containing a basic nitrogen atom to which there is attached a hydrocarbon radical containing between 12 and 18 carbon atoms,
    (b) permitting the fabric to remain in contact with said fluid a time sufficient to permit an appreciable amount of said organic compound to become permanently associated with the fibers of said fabric,
    (c) scouring the resulting fabric to remove any of said oganic compound not permanently associated with the fibers of the fabric, and,
    (d) dyeing said fabric with a water-soluble anionic textile dye.

21. A process as in claim 20 where the organic compound is applied in controlled localized areas from a print paste so as to give a patterned coloring.

22. A colored fabric formed of fibers of solid polyolefin produced by the process as defined in claim 20.

23. A process as in claim 20 where said hydrocarbon radical attached to the nitrogen atom is an alkyl radical containing between 12 and 18 carbon atoms.

24. A process for coloring a fabric formed of fibers composed of solid polyolefin which comprises:
    (a) contacting the fibers of said fabric with a N–12 to 18 carbon atom alkyl alkylene polyamine having a molecular weight between about 150 and 600,
    (b) heating said fibers while in contact with said amine to a temperature between about 100° F., and 10° F. below the melting point of said polyolefin to permanently associate at least part of said amine with the fibers,
    (c) treating the resulting article to remove therefrom any of said amine not permanently associated with said fibers, and
    (d) dyeing said article with a water-soluble anionic textile dye.

25. A process for coloring a fabric formed of fibers of a solid polymer of a 2 to 4 carbon atom olefin which comprises:
    (a) wetting said fibers with a fluid comprising an oleophilic organic compound having a molecular weight between about 150 and 600 containing a basic nitrogen atom to which there is attached a hydrocarbon radical containing at least 6 carbon atoms,
    (b) drying the fabric,
    (c) heating the dried fabric to a temperature between about 100° F. and 10° F. below the fusion temperature of said fibers for between about 1 and 120 minutes,
    (d) scouring the resulting fabric to remove any of said organic compound not permanently associated with said fibers, and
    (e) dyeing said fabric with a water-soluble anionic textile dye.

26. A preformed article composed of solid polyolefin capable of being dyed in deep shades with water-soluble anionic textile dyes having an oleophilic organic compound possessing a molecular weight between about 100 and 800 containing a basic nitrogen atom to which there is attached a hydrocarbon radical containing at least 6 carbon atoms permanently associated therewith.

27. Fibers composed of solid polymer of a 2 to 4 carbon atom olefin capable of being dyed in deep shades with water-soluble anionic textile dyes which comprise between about 0.01 and 10% by weight based upon the total weight of said fibers of an oleophilic organic compound having a molecular weight between about 150 and 600 containing a basic nitrogen atom to which there is attached a hydrocarbon radical containing at least 6 carbon atoms, said organic compound not forming a part of the molecules of said solid polymer.

28. A process for rendering preformed articles of solid polymers of olefins which normally are incapable of being satisfactorily dyed with aqueous dye baths capable of being dyed in deep shades with water-soluble anionic textile dyes which comprises:
    (a) impregnating said preformed article with an oleophilic organic compound having a molecular weight between about 100 and 800 containing a basic nitrogen atom to which there is attached a hydrocarbon radical containing at least 6 carbon atoms, and (b) treating the resulting article to remove therefrom any of said organic compound not permanently associated with said article.

29. A process for rendering fibers of polyolefins which normally are incapable of being satisfactorily dyed with aqueous dye baths capable of being dyed in deep shades with water-soluble anionic textile dyes which comprises:

(a) wetting said fibers with a fluid comprising an oleophilic organic compound having a molecular weight between about 150 and 600 containing a basic nitrogen atom to which there is attached a hydrocarbon radical containing at least 12 carbon atoms, (b) drying the fibers, (c) heating the dried fibers to a temperature between about 100° F. and 10° F. below the fusion temperature of said fibers between about 1 and 120 minutes, and, thereafter, (d) scouring the resulting fibers.

30. A process for treatment of preformed articles of solid polymers of olefins to render them receptive to dyes and pigments which comprises impregnating a preformed article of a solid polyolefin with an oleophilic organic compound having a molecular weight between about 100 and 800 containing polar substituent.

References Cited in the file of this patent

UNITED STATES PATENTS

| | | |
|---|---|---|
| 2,136,928 | Schlack | Nov. 15, 1938 |
| 2,267,205 | Kyrides | Dec. 23, 1941 |
| 2,317,756 | Graenacher et al. | Apr. 27, 1943 |
| 2,899,262 | Stanton et al. | Aug. 11, 1959 |
| 2,928,712 | Bradshaw | Mar. 15, 1960 |